United States Patent [19]

Tabacchi

[11] Patent Number: 4,743,105

[45] Date of Patent: May 10, 1988

[54] DEVICE FOR SECURING THE ENDS OF A STRAP DETACHABLY TO EYEGLASSES LEGS

[75] Inventor: Vittorio Tabacchi, Pieve Di Cadore, Italy

[73] Assignee: Optifashion S.r. L., Pieve Di Cadore, Italy

[21] Appl. No.: 858,610

[22] Filed: May 1, 1986

[30] Foreign Application Priority Data

May 3, 1985 [IT] Italy .............................. 21719/85[U]

[51] Int. Cl.⁴ .............................................. G02C 3/00
[52] U.S. Cl. .................................... 351/156; 351/157
[58] Field of Search ....................... 351/156, 157, 123

[56] References Cited

U.S. PATENT DOCUMENTS 1,819,738  8/1931  Daniels ................................ 351/156

Primary Examiner—John K. Corbin
Assistant Examiner—P. M. Dzierzynski
Attorney, Agent, or Firm—Rosen, Dainow & Jacobs

[57] ABSTRACT

The device comprises a sleeve element locatable on a portion of each eyeglasses leg coaxially therewith, and a half-tubular element provided with a plate-like end for connection to the end of the strap, said half-tubular element having an inside profile that conforms with the outside profile of said sleeve whereover it is engageable by snap action.

6 Claims, 2 Drawing Sheets

DEVICE FOR SECURING THE ENDS OF A STRAP DETACHABLY TO EYEGLASSES LEGS

This invention relates to a device affording connection and disconnection of a safety strap to/from the legs or temples of generic eyeglasses.

As is known, especially with eyeglasses for children, it is expedient to arrange for a strap to pass around the back of the head and interconnect the eyeglasses' legs so as to ensure stable positioning thereof and prevent while playing, for example, the eyeglasses from being dropped and the lenses shattered.

It is also known to provide eyeglasses legs, even for adult use and whether sightglasses or sunglasses, with flexible straps whereby the glasses may be left hanging from one's neck while not in use.

In summary, the invention is concerned with a device for quickly and effectively attaching a strap as specified above to the legs of glasses.

According to the pertinent prior art, devices for detachably securing straps to eyeglasses legs are based essentially on the use of rings and hooks, the former incorporated to the glasses legs and the latter to the strap ends. It is also conventional to employ elastic tubular elements which are connected permanently to the strap ends, and when the latter is to be connected to the glasses legs the elastic tubular elements are slipped or fitted over the legs themselves.

Such prior devices openly exhibit some drawbacks, primarily that of affording no easy way for the user of connecting them to the glasses legs, some prior devices require that hooks be fitted through rings of small diameter, and others require that elastic tubular elements be slipped over the free curved ends of the legs and pushed to a point somewhere on the straight portions of the glasses.

SUMMARY OF THE INVENTION

It is, therefore, the object of this invention to obviate such drawbacks affecting prior art devices by providing a device for securing the ends of a strap detachably to eyeglasses legs, which is extremely easy to use and affords good holding capabilities against the likelihood of the glasses being dropped as a consequence of the strap separating suddenly and unintentionally from the legs.

This and other objects to become apparent hereinafter are achieved by a device for securing the ends of a strap detachably to eyeglasses legs, according to the invention, which is characterized in that it comprises a sleeve element locatable on a portion of each leg coaxially therewith, and a half-tubular connecting element provided with a plate-like end for connection to one end of the strap, said half-tubular partial-tubular connecting element having an inside profile conforming with the outside profile of said sleeve wherewith it is engageable by snap action.

Preferably, the outer surface of said sleeve would be corrugated, just like the inner surface of said half-tubular element intended to snap-action engage on the sleeve.

According to the preferred embodiment of the invention, the sleeve is formed from an elastic material and is configured as bellows lying coaxial with the respective glasses leg, and the bights in the bellows form said corrugations of the outer surface.

The invention features will be now described in further detail with reference to the accompanying drawings:

DETAILED DESCRIPTION OF THE PREFERRED EMBODIMENT

Figure 1:
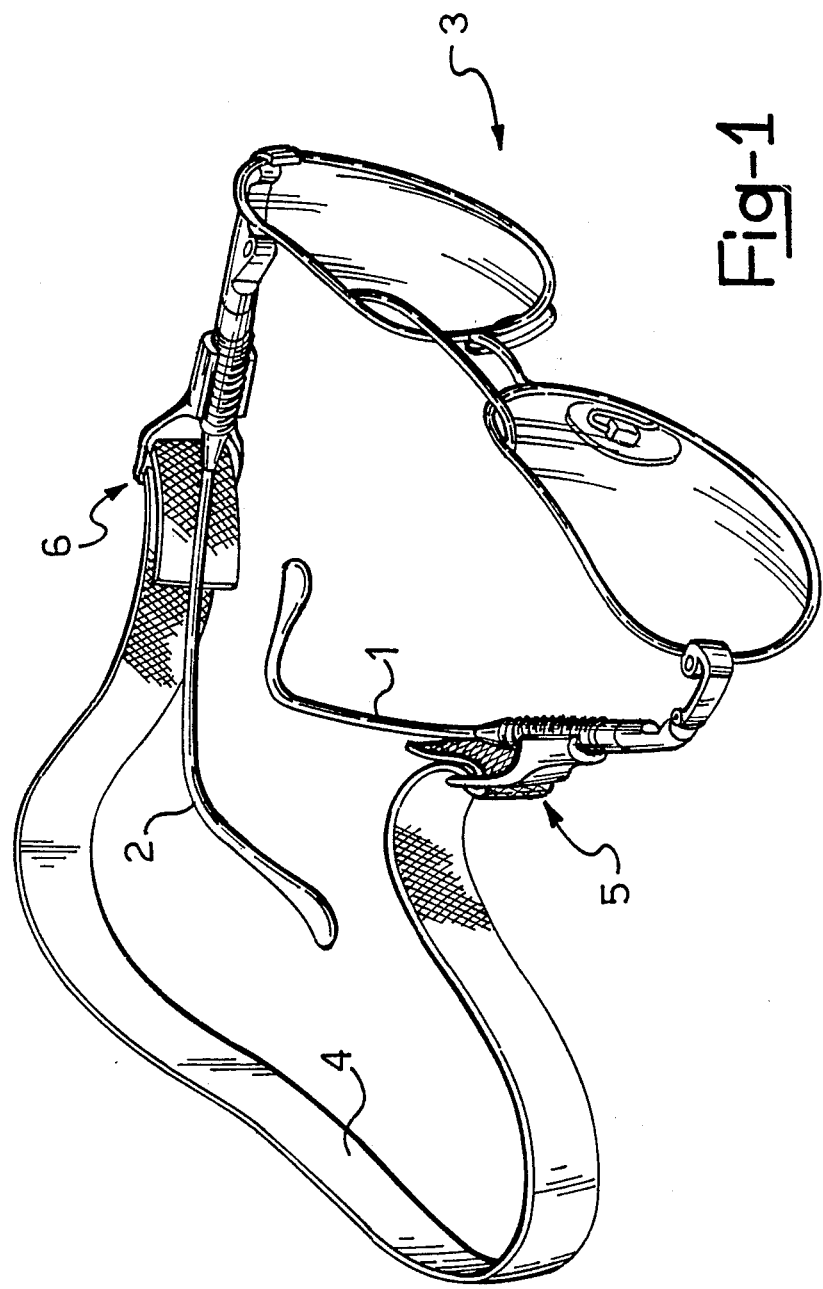
FIG. 1 is a perspective view of eyeglasses equipped with a safety strap secured to the legs by the inventive device.
Figure 2:
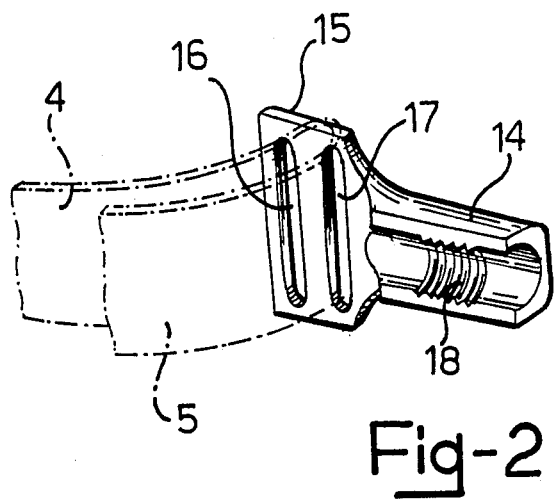
FIG. 2 is an enlarged scale perspective view of the securing device according to the invention in the inoperative condition thereof.
Figure 3:
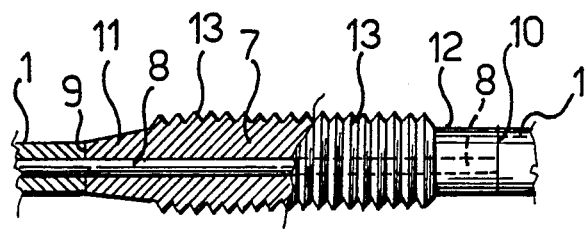
FIG. 3 is a longitudinal section showing partly in full view the sleeve as mounted on an eyeglasses leg.

With reference to the aforesaid drawing, indicated at 1 and 2 are the legs of eyeglasses comprehensively designated 3. With specific reference to FIG. 1, the numeral 4 designates a safety strap, the ends 5 and 6 whereof are adapted for connection to the legs 1 and 2 of the eyeglasses 3 as a safeguarding measure against incidental dropping.

Connection of the strap 4 to the legs is accomplished by means of a pair of the devices according to the invention, one for each of the ends 5 and 6.

For simplicity and because the securing devices are quite alike, the ensuing discussion will be restricted to just the device applied to the end 5 of the strap 4 and its respective leg 1.

This device comprises a sleeve element 7 of cylindrical shape, which is fitted coaxially over the portion 8 of the leg. The portion 8 has a smaller diameter than the overall outside transverse dimension of the leg 1, thereby forming opposed annular abutments 9 and 10.

Against such abutments, the ends of the tubular extensions 11 and 12 of the sleeve 7 are made to bear.

In the embodiment shown, the sleeve 7 and its respective parts 11 and 12 are formed from an elastic material and fashioned bellows-like. That bellows-like configuration provides a set of annular corrugations 13 on the outer surface of the sleeve 7.

The device is completed by the half-tubular element 14 which has a plate-like terminating end 15. The latter is formed with a pair of slots, indicated at 16 and 17, wherethrough the end 5 of the strap 4 is passed in a conventional manner for securement by a conventional buckle.

The half-tubular element 14 has a profile conforming with the outside profile of the sleeve 7, which is circular in the embodiment shown. The inside surface of the half-tubular element 14 is provided with corrugations as indicated at 18. The element 14 is intended for engagement over the sleeve 7 by a snap-action movement, and the corrugations 13 and 18 are effective to enhance the grip between the confronting surfaces. The material comprising the half-tubular element 14 and its plate-like portion 15 may be the same as used for the sleeve 7, or be, preferably, a relatively stiffer material to ensure a more effective attachment and detachment operation.

The mode of using the device is self-evident from the above description and illustration. Also apparent is the advantage of being able to connect the strap to the legs of eyeglasses in a simple and quick manner, as against the prior art procedures.

I claim:

1. Apparatus for securing the ends of a strap detachably to temples of an eyeglass frame, the apparatus comprising a pair of sleeve elements, one locatable on a portion of each temple coaxially therewith, each sleeve element having an exposed outside surface, and a pair of connectors, each connector comprising a partial-tubular portion and a second portion element, each second portion element being connectable to one end of the strap, each of said partial-tubular portions having an inside surface conforming with the outside surface of said sleeve wherewith it is detachably engageable by snap action.

2. Apparatus according to claim 1, wherein the second portion of said partial-tubular element is plate-like and includes a pair of slots for receiving the strap for securing the strap to said second portion.

3. Apparatus according to claim 1, wherein said sleeve element is cylindrical and the outside surface thereof comprises corrugations.

4. Apparatus according to claim 3, wherein the inside surface of each partial-tubular element comprises corrugations corresponding to the corrugations on each sleeve element.

5. Apparatus according to any of claims 3 or 4, wherein each sleeve element comprises an elastic material configured as a bellows locatable coaxially on one of said temples, the bights in said bellows forming said outer surface corrugations.

6. Apparatus according to claim 5 for use with an eyeglass frame where each temple has an annular abutment near the end of the temple attached to the frame, wherein each bellows sleeve element has at least one end a cylindrical part extending axially outward from said bellows for engagement with the corresponding abutment on said temple.

* * * * *